US012345167B2

(12) United States Patent
Godbole et al.

(10) Patent No.: US 12,345,167 B2
(45) Date of Patent: *Jul. 1, 2025

(54) SYSTEM AND METHOD OF USING A TOOL ASSEMBLY

(71) Applicants: General Electric Company, Schenectady, NY (US); Oliver Crispin Robotics Limited, Altrincham (GB)

(72) Inventors: Mandar Diwakar Godbole, Bengaluru (IN); Byron Andrew Pritchard, Jr., Loveland, OH (US); Kirti Arvind Petkar, Bengaluru (IN); Vamshi Krishna Reddy Kommareddy, Bengaluru (IN); Sandeep Kumar, Bengaluru (IN); Andrew Crispin Graham, Badminton (GB)

(73) Assignees: General Electric Company, Evendale, OH (US); Oliver Crispin Robotics Limited, Altrincham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,402

(22) Filed: Jan. 23, 2024

(65) Prior Publication Data

US 2024/0159162 A1 May 16, 2024

Related U.S. Application Data

(63) Continuation of application No. 17/471,923, filed on Sep. 10, 2021, now Pat. No. 11,913,345.

(30) Foreign Application Priority Data

Jul. 26, 2021 (IN) .............................. 202111033483

(51) Int. Cl.
*G06T 7/60* (2017.01)
*F01D 21/00* (2006.01)
(Continued)

(52) U.S. Cl.
CPC ........... *F01D 21/003* (2013.01); *G01M 15/14* (2013.01); *G06T 7/001* (2013.01); *G06T 7/60* (2013.01);
(Continued)

(58) Field of Classification Search
None
See application file for complete search history.

(56) References Cited

U.S. PATENT DOCUMENTS

| 5,633,946 A | 5/1997 | Lachinski |
| 6,512,892 B1 | 1/2003 | Montgomery |

(Continued)

FOREIGN PATENT DOCUMENTS

| CN | 104620095 | 5/2015 |
| CN | 108394426 | 8/2018 |

(Continued)

OTHER PUBLICATIONS

U.S. Appl. No. 17/471,923; Final Rejection mailed Jun. 13, 2023; (pp. 1-15).

(Continued)

*Primary Examiner* — Samuel D Fereja
(74) *Attorney, Agent, or Firm* — Fitch Even Tabin & Flannery LLP

(57) ABSTRACT

A system and method of using a tool assembly is provided. The system includes a body, a first camera and a second camera fixed to the body, and a controller. The controller is configured to receive data indicative of images of a reference feature from the first camera, determine data indicative of a first spatial position of the first camera based at least in part on the received data indicative of the images of the reference feature, and determine data indicative of a second spatial position of the second camera based on the first spatial position, a known spatial relationship between the (Continued)

first location and the second location, or both. Further, the controller may be configured to receive data indicative of images of a target feature using the second camera, derive dimensions of the target feature based on the images, and generate a three-dimensional representation of the target feature.

18 Claims, 6 Drawing Sheets

(51) Int. Cl.
  *G01M 15/14* (2006.01)
  *G06T 7/00* (2017.01)
  *G06T 7/80* (2017.01)
(52) U.S. Cl.
  CPC .. *F05D 2260/80* (2013.01); *F05D 2270/8041* (2013.01); *G06T 2207/30164* (2013.01)

(56) References Cited

U.S. PATENT DOCUMENTS

| | | | |
|---|---|---|---|
| 6,969,821 B2 | 11/2005 | Mika | |
| 7,272,254 B2 | 9/2007 | Shankarappa | |
| 7,627,447 B2 | 12/2009 | Marsh | |
| 8,060,835 B2 | 11/2011 | Newcomer | |
| 8,442,665 B2 | 5/2013 | Krause | |
| 8,477,154 B2 | 7/2013 | Davis | |
| 8,602,722 B2 | 12/2013 | George | |
| 9,300,926 B2 | 3/2016 | Kell | |
| 9,458,735 B1 | 10/2016 | Diwinsky | |
| 10,070,118 B2 | 9/2018 | Baran | |
| 10,543,859 B2 | 1/2020 | Gomes | |
| 10,717,166 B2 | 7/2020 | Lipkin | |
| 10,775,315 B2 | 9/2020 | Mekala | |
| 10,808,534 B2 | 10/2020 | Danko | |
| 10,920,590 B2 | 2/2021 | Lipkin | |
| 11,103,964 B2 | 8/2021 | Lipkin | |
| 2003/0179920 A1 | 9/2003 | Hooker | |
| 2004/0262277 A1 | 12/2004 | Mika | |
| 2005/0008213 A1 | 1/2005 | Shankarappa | |
| 2008/0177411 A1 | 7/2008 | Marsh | |
| 2008/0247636 A1 | 10/2008 | Davis | |
| 2008/0307327 A1 | 12/2008 | Newcomer | |
| 2011/0087352 A1 | 4/2011 | Krause | |
| 2011/0134225 A1 | 6/2011 | Saint-Pierre | |
| 2011/0211940 A1 | 9/2011 | George | |
| 2013/0027515 A1 | 1/2013 | Vinther | |
| 2014/0125791 A1 | 5/2014 | Arellano | |
| 2014/0176705 A1 | 6/2014 | Ibamoto | |
| 2014/0300729 A1 | 10/2014 | Drescher | |
| 2017/0085867 A1 | 3/2017 | Baran | |
| 2018/0211373 A1 | 7/2018 | Stoppa | |
| 2019/0342499 A1* | 11/2019 | Xiong | H04N 17/002 |
| 2019/0342543 A1 | 11/2019 | Li | |
| 2020/0025039 A1 | 1/2020 | Danko | |
| 2020/0180084 A1 | 6/2020 | Lipkin | |
| 2022/0082473 A1 | 3/2022 | Peters | |
| 2022/0084178 A1 | 3/2022 | Peters | |
| 2023/0024295 A1 | 1/2023 | Godbole | |

FOREIGN PATENT DOCUMENTS

| | | |
|---|---|---|
| CN | 109272453 | 1/2019 |
| EP | 3070459 | 9/2016 |

OTHER PUBLICATIONS

U.S. Appl. No. 17/471,923; Notice of Allowance and Fees Due (PTOL-85) mailed Oct. 27, 2023; (pp. 1-8).

* cited by examiner

SYSTEM AND METHOD OF USING A TOOL ASSEMBLY

CROSS-REFERENCE TO RELATED APPLICATIONS

This application is a continuation of U.S. application Ser. No. 17/471,923, filed on Sep. 10, 2021, which claims foreign priority to Indian Patent Application No. 202111033483, which was filed on Jul. 26, 2021, which are hereby incorporated herein by reference.

FIELD OF THE DISCLOSURE

The present subject matter relates generally to a method for inspecting machinery such as a gas turbine engine.

BACKGROUND OF THE PRESENT DISCLOSURE

In a variety of industries, inspection tools are used to detect damaged or deteriorated components. For example, in the aviation industry, certain gas turbine engines include thousands of internal components, including hundreds of compressor and turbine blades, which need to be frequently inspected to ensure they are in working order and not damaged.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
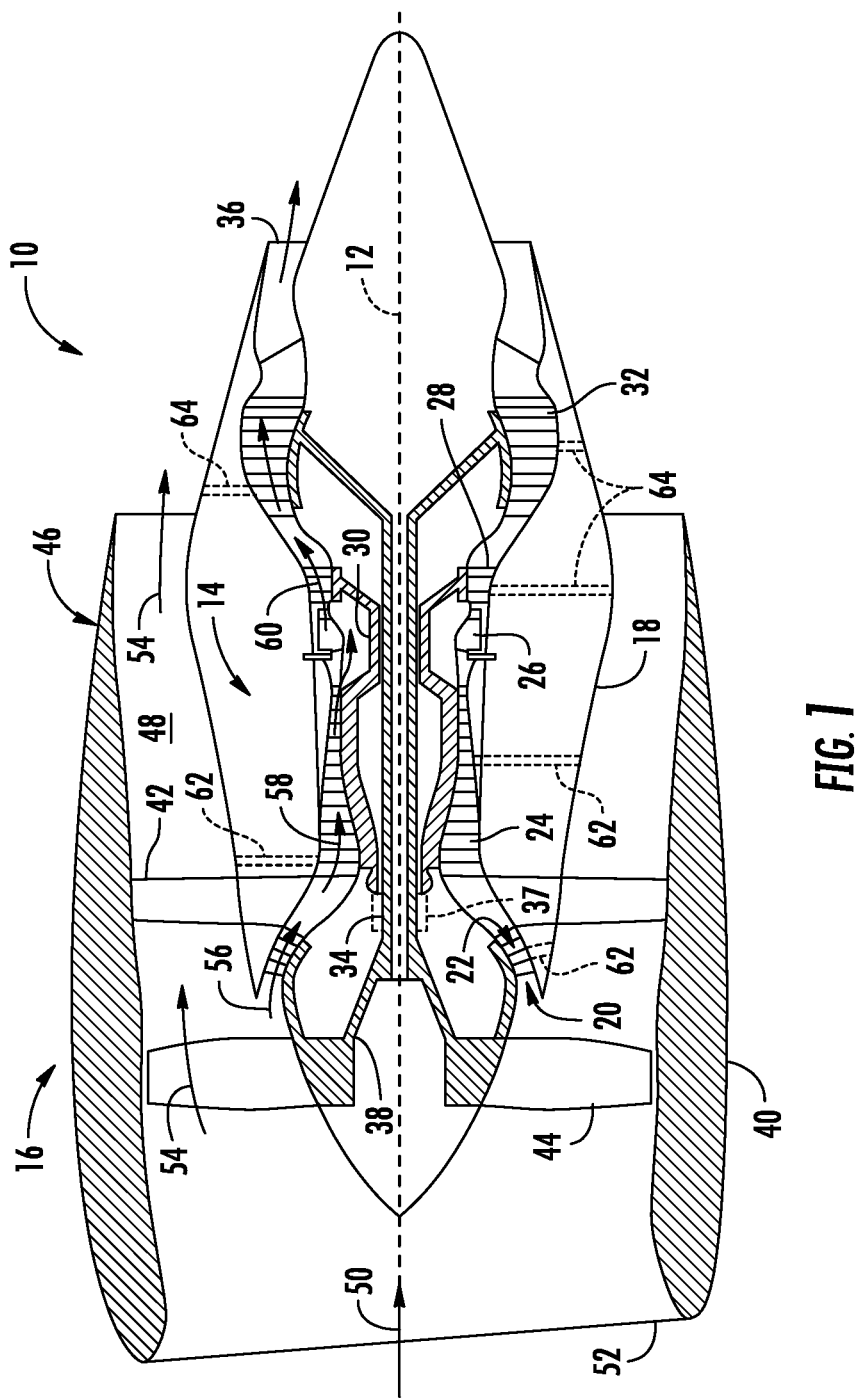
FIG. 1 is a schematic representation of an exemplary gas turbine which may be inspected according to embodiments of the present disclosure.

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," is not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints.

Further, as used herein, the term "substantially" may refer to an amount that is more than halfway, e.g., greater than 50%, greater than 60%, greater than 70%, greater than 75%, greater than 80%, greater than 85%, greater than 90%, greater than 95%, or greater than 99%.

Additionally, the term "rotor blade," without further specificity, is a reference to the rotating blades of either the compressor or the turbine, which include both compressor rotor blades and turbine rotor blades. The term "stator blade," without further specificity, is a reference to the stationary blades of either the compressor or the turbine, which include both compressor stator blades and turbine stator blades. The term "compressor blade," without further specificity, is a reference to both compressor rotor blades and compressor stator blades. Thus, without further specificity, the term "blades" is inclusive to all type of turbine engine blades, including compressor rotor blades, compressor stator blades, turbine rotor blades, and turbine stator blades. Further, the descriptive or standalone term "blade surface" may reference any type of turbine or compressor blade and may include any or all portions of the blade, including the suction side face, pressure side face, blade tip, blade shroud, platform, root, and shank.

Finally, given the configuration of compressor and turbine about a central common axis, as well as the cylindrical configuration common to many combustor types, terms describing position relative to an axis may be used herein. In this regard, it will be appreciated that the term "radial" refers to movement or position perpendicular to an axis. Related to this, it may be required to describe relative distance from the central axis. In this case, for example, if a first component resides closer to the central axis than a second component, the first component will be described as being either "radially inward" or "inboard" of the second component. If, on the other hand, the first component resides further from the central axis than the second component, the first component will be described herein as being either "radially outward" or "outboard" of the second component. Additionally, as will be appreciated, the term "axial" refers to movement or position parallel to an axis. Finally, the term "circumferential" refers to movement or position around an axis. As mentioned, while these terms may be applied in relation to the common central axis that extends through the compressor and turbine sections of the engine, these terms may also be used in relation to other components or sub-systems of the engine.

During operation of a gas turbine engine, the blades of both the compressor and turbine are subject to damage from a variety of sources, including creep from long-term exposure to heat, cracks and stress from fatigue, and nicking in the blade surface from foreign particles of dust and other materials present in the air flowing through the gas turbine engine. Such incidents of damage introduce deformations in the surface of blades, concomitantly reducing the overall efficiency and increasing the fuel consumption needed for the gas turbine engine to operate at a desired output. Moreover, damage to engine components may result in increased maintenance costs and decreased engine life.

To determine blade surface damage, the gas turbine engine is occasionally removed from operation, disassembled, and inspected to ensure that the blades are properly functioning. A major component of this inspection typically includes a visual inspection of the surfaces of each blade, looking for signs of damage, including deformations, tears, rips, holes, cracks, and any other defects. The inspection may be performed manually for each surface of each blade, introducing a high amount of error and variability in the process of maintaining blades. Moreover, for the inspection process to yield meaningful results, an enormous investment in both time and labor resources is required. Further, if multiple inspectors are being used to inspect the engine, inspector-to-inspector variations typically exist with respect to the thoroughness and/or accuracy of the inspection. In some cases, inspectors may use a camera to perform these visual inspections. Accordingly, an improved method of determining defects of a gas turbine engine would be welcomed in the art.

In general, the present subject matter generally relates to a system and method for improved inspection of a gas turbine engine. In particular, the present disclosure relates to a tool assembly including a body; a first camera; a second camera; and a controller configured to receive data indicative of one or more images of a reference feature from the first camera, determine data indicative of a first spatial position of the first camera based at least in part on the received data indicative of the one or more images of the reference feature, and determine data indicative of a second spatial position of the second camera based on the first spatial position. The controller may further be configured to receive data indicative of one or more images of a target feature using the second camera; determine data indicative of one or more dimensions of the target feature based at least in part on the received data indicative of the one or more images of the target feature, receive data indicative of one or more images of a reference feature from the first camera; determine data indicative of a first spatial position of the first camera based at least in part on the received data indicative of the one or more images of the reference feature; and determine data indicative of a second spatial position of the second camera based on the first spatial position, a known spatial relationship between the first location and the second location, or both; and generate a three-dimensional representation of the target feature. The three-dimensional representation of the target feature may be used to locate, inspect, and/or measure defects within the gas turbine engine.

Referring now to the drawings, FIG. 1 illustrates a cross-sectional view of one embodiment of a gas turbine engine 10 that may be utilized within an aircraft in accordance with aspects of the present subject matter, with the gas turbine engine 10 being shown having a longitudinal or axial centerline axis 12 extending therethrough for reference purposes. In general, the gas turbine engine 10 may include a core gas turbine engine (indicated generally by reference character 14) and a fan section 16 positioned upstream thereof. The core engine 14 may generally include an outer casing 18 that is substantially tubular and defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the gas turbine engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

It should be appreciated that each compressor 22, 24 may include a plurality of compressor stages, with each stage including both an annular array of stationary compressor vanes and an annular array of rotating compressor blades positioned immediately downstream of the compressor vanes. Similarly, each turbine 28, 32 may include a plurality of turbine stages, with each stage including both an annular array of stationary nozzle vanes and an annular array of rotating turbine blades positioned immediately downstream of the nozzle vanes.

Additionally, as shown in FIG. 1, the fan section 16 of the gas turbine engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the gas turbine engine 10 as desired or required.

During operation of the gas turbine engine 10, it should be appreciated that an initial air flow (indicated by arrow 50) may enter the gas turbine engine 10 through an associated inlet 52 of the fan casing 40. The air flow 50 then passes through the fan rotor blades 44 and splits into a first compressed air flow (indicated by arrow 54) that moves through airflow conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the gas turbine engine 10.

As indicated above, the gas turbine engine 10 may also include a plurality of access ports defined through its casings and/or frames for providing access to the interior of the core engine 14. For instance, as shown in FIG. 1, the gas turbine engine 10 may include a plurality of access ports 62 (only three of which are shown) defined through the outer casing 18 for providing internal access to one or both of the compressors 22, 24. Similarly, as shown in the illustrated embodiment, the gas turbine engine 10 may include a plurality of access ports 64 (only three of which are shown) defined through the outer casing 18 for providing internal access to one or both of the turbines 28, 32. In several embodiments, the access ports 62, 64 may be spaced apart axially along the core engine 14. For instance, the compressor access ports 62 may be spaced apart axially along each compressor 22, 24 such that at least one access port 62 is located at each compressor stage for providing access to the compressor vanes and blades located within such stage. Similarly, the turbine access ports 64 may be spaced apart axially along each turbine 28, 32 such that at least one access port 64 is located at each turbine stage for providing access to the nozzle vanes and turbine blades located within such stage.

It should be appreciated that, although the access ports 62, 64 are generally described herein with reference to providing internal access to one or both of the compressors 22, 24 and/or for providing internal access to one or both of the turbines 28, 32, the gas turbine engine 10 may include access ports providing access to any suitable internal location of the gas turbine engine 10, such as by including access ports that provide access within the combustor 26 and/or any other suitable component of the gas turbine engine 10. Furthermore, the present disclosure may be used to inspect any component of the gas turbine engine 10.

It will be appreciated that the exemplary gas turbine engine 10 depicted in FIG. 1 and described above is provided by way of example only. In other embodiments, the gas turbine engine 10 may have any other suitable configuration, such as a geared connection with the fan rotor blades 44; a variable pitch fan; any suitable number of shafts/spools, compressors, or turbines; etc. Additionally, although depicted as a ducted turbofan engine, in other embodiments, the gas turbine engine 10 may be configured as an unducted turbofan engine, a turboshaft engine, a turboprop engine, a turbojet engine, etc.

Figure 2:
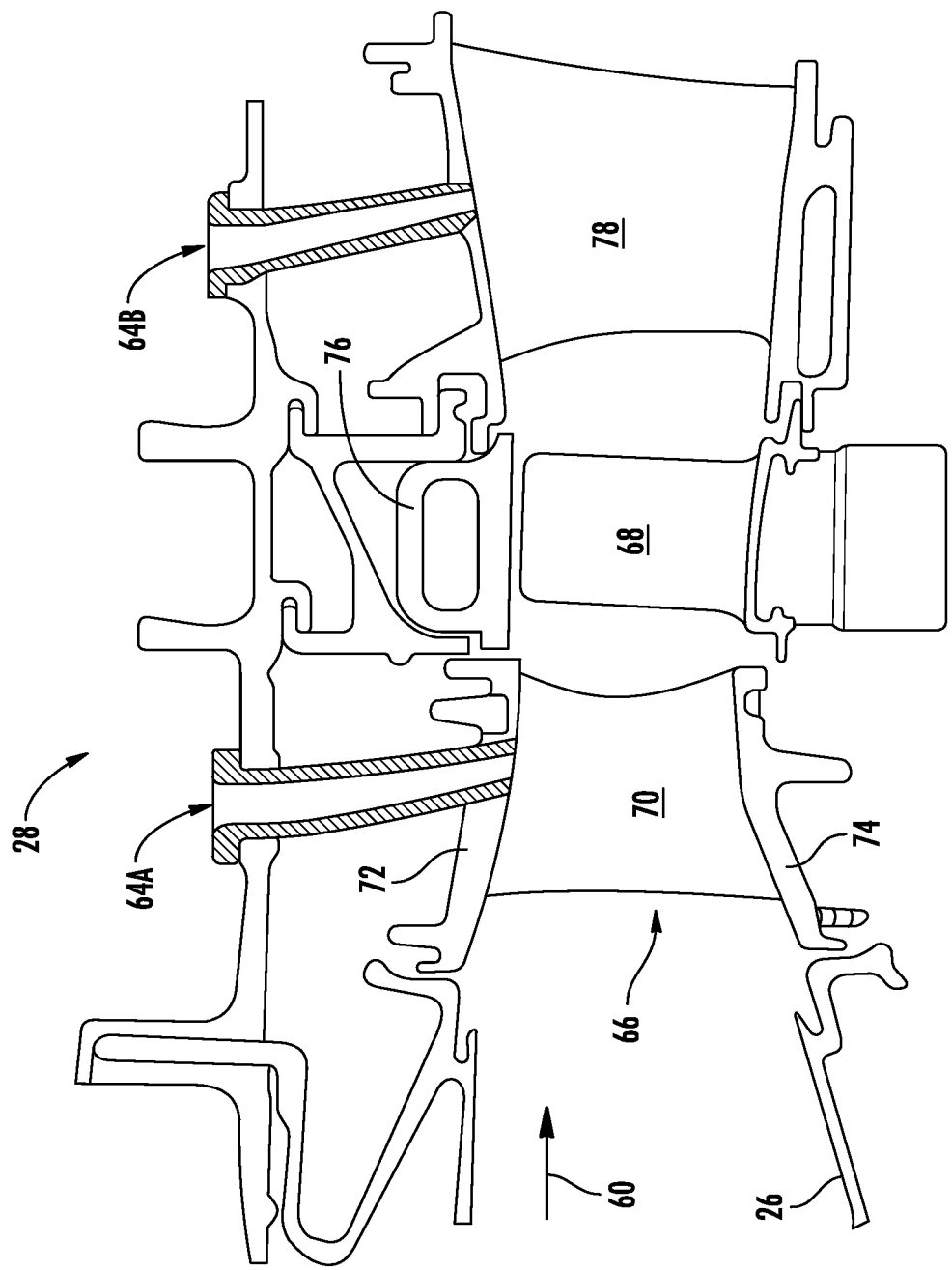
FIG. 2 is a partial, cross-sectional view of a high pressure turbine within the gas engine turbine.

Referring now to FIG. 2, a partial, cross-sectional view of the first (or high pressure) turbine 28 described above with reference to FIG. 1 is illustrated in accordance with embodiments of the present subject matter. As shown, the first turbine 28 may include a first stage turbine nozzle 66 and an annular array of rotating turbine blades 68 (one of which is shown) located immediately downstream of the first stage turbine nozzle 66. The first stage turbine nozzle 66 may generally be defined by an annular flow channel that includes a plurality of radially-extending, circularly-spaced nozzle vanes 70 (one of which is shown). The vanes 70 may be supported between a number of arcuate outer bands 72 and arcuate inner bands 74. Additionally, the circumferentially spaced turbine blades 68 may generally be configured to extend radially outwardly from a rotor disk (not shown) that rotates about the axial centerline axis 12 (FIG. 1) of the gas turbine engine 10. Moreover, a turbine shroud 76 may be positioned immediately adjacent to the radially outer tips of the turbine blades 68 so as to define the outer radial flowpath boundary for the combustion products 60 flowing through the turbine 28 along the hot gas path of the engine 10.

As indicated above, the turbine 28 may generally include any number of turbine stages, with each stage including an annular array of nozzle vanes and follow-up turbine blades 68. For example, as shown in FIG. 2, an annular array of nozzle vanes 78 of a second stage of the turbine 28 may be located immediately downstream of the turbine blades 68 of the first stage of the turbine 28.

Moreover, as shown in FIG. 2, a plurality of access ports 64 may be defined through the turbine casing and/or frame, with each access port 64 being configured to provide access to the interior of the turbine 28 at a different axial location. Specifically, as indicated above, the access ports 64 may, in several embodiments, be spaced apart axially such that each access port 64 is aligned with or otherwise provides interior access to a different stage of the turbine 28. For instance, as shown in FIG. 2, a first access port 64A may be defined through the turbine casing/frame to provide access to the first stage of the turbine 28 while a second access port 64B may be defined through the turbine casing/frame to provide access to the second stage of the turbine 28.

It should be appreciated that similar access ports 64 may also be provided for any other stages of the turbine 28 and/or for any turbine stages of the second (or low pressure) turbine 32. It should also be appreciated that, in addition to the axially spaced access ports 64 shown in FIG. 2, access ports may be provided at differing circumferentially spaced locations. For instance, in one embodiment, a plurality of circumferentially spaced access ports may be defined through the turbine casing/frame at each turbine stage to provide interior access to the turbine 28 at multiple circumferential locations around the turbine stage.

Figure 3:
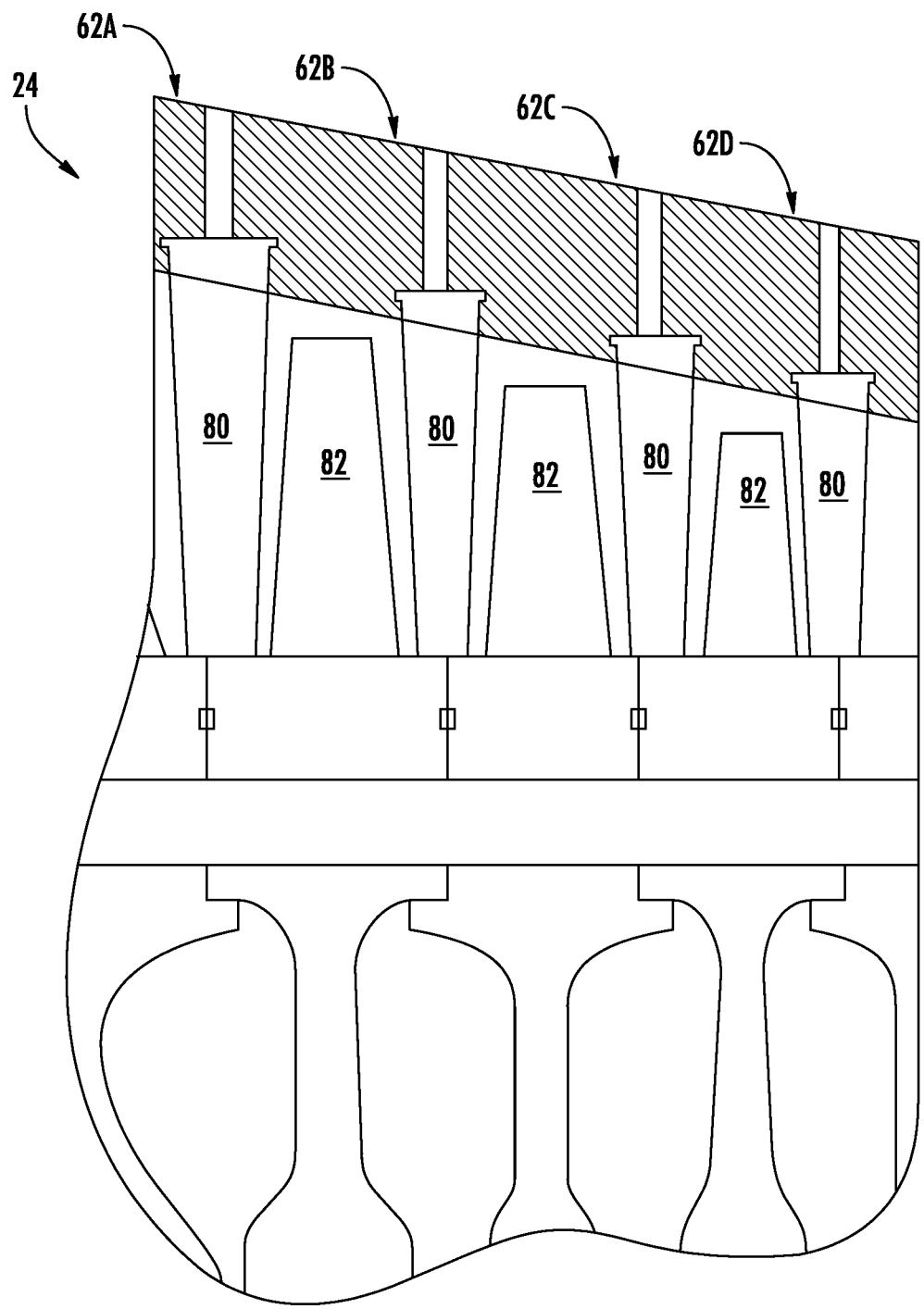
FIG. 3 shows a cross-sectional illustration of a high pressure compressor with a plurality of compressor stages.

Referring now to FIG. 3, a partial, cross-sectional view of the high pressure compressor 24 described above with reference to FIG. 1 is illustrated in accordance with embodiments of the present subject matter. As shown, the compressor 24 may include a plurality of compressor stages, with each stage including both an annular array of fixed compressor vanes 80 (only one of which is shown for each stage) and an annular array of rotatable compressor blades 82 (only one of which is shown for each stage). Each row of fixed compressor vanes 80 is generally configured to direct air flowing through the compressor 24 to the row of compressor blades 82 immediately downstream thereof.

Moreover, as indicated above, the compressor 24 may include a plurality of access ports 62 defined through the compressor casing/frame, with each access port 62 being configured to provide access to the interior of the compressor 24 at a different axial location. Specifically, in several embodiments, the access ports 62 may be spaced apart axially such that each access port 62 is aligned with or otherwise provides interior access to a different stage of the compressor 24. For instance, as shown in FIG. 3, first, second, third and fourth access ports 62A, 62B, 62C, 62D are illustrated that provide access to four successive stages, respectively, of the compressor 24.

It should be appreciated that similar access ports may also be provided for any of the other stages of the compressor 24 and/or for any of the stages of the booster compressor 22. It should also be appreciated that, in addition to the axially spaced access ports 62 shown in FIG. 3, access ports may be also provided at differing circumferentially spaced locations. For instance, in one embodiment, a plurality of circumferentially spaced access ports may be defined through the compressor casing/frame at each compressor stage to provide interior access to the compressor 24 at multiple circumferential locations around the compressor stage.

Figure 4:
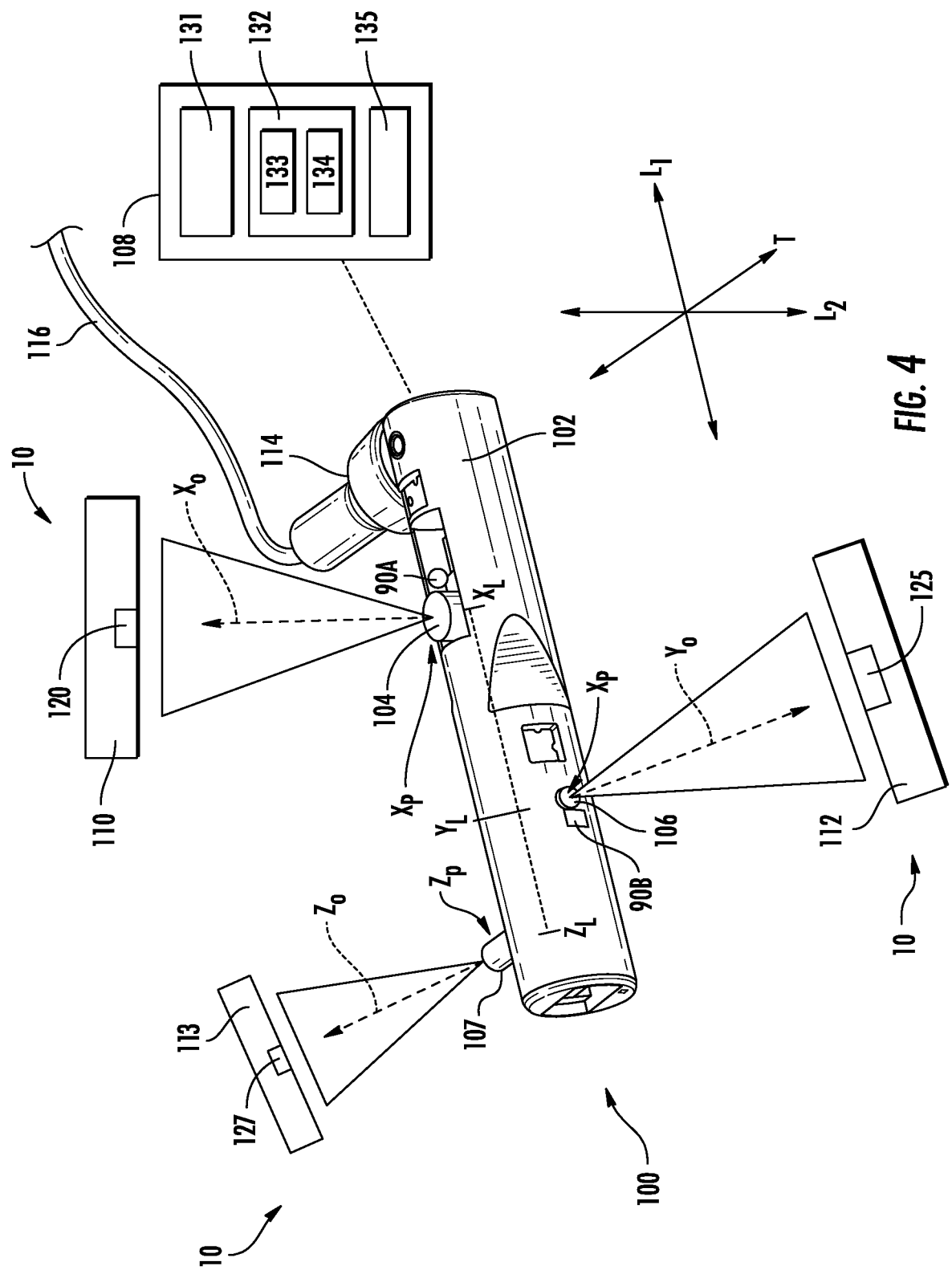
FIG. 4 is a perspective view of an inspection tool assembly within the gas turbine engine.

Referring now to FIG. 4, a perspective, schematic view of a tool assembly 100 is shown within a gas turbine engine 10 in accordance with an exemplary embodiment of the present subject matter. In certain embodiments, the gas turbine engine 10 depicted schematically in FIG. 4 may be configured in a similar manner as the exemplary gas turbine engine 10 of FIG. 1.

In general, the tool assembly 100 includes a body 102, a first camera 104 fixed to the body 102 at a first location $X_L$ and in a first spatial position, a second camera 106 fixed to the body 102 at a second location $Y_L$ and in a second spatial position, and a controller 108 in operative communication with the first camera 104 and the second camera 106. Additionally, in the exemplary embodiment, the spatial relationship between the first location $X_L$ and the second location $Y_L$ is known. The body 102, in another exemplary embodiment, is elongated and defines a local longitudinal direction $L_1$, a latitudinal direction $L_2$, and a transverse direction T. The first location $X_L$ is spaced from the second location $Y_L$ along the longitudinal direction $L_1$. As will be explained more in depth below, the spatial position of an object may refer to both the relative position and the relative orientation of the object. For example, the first spatial position comprises a first position $X_P$ and a first orientation $X_O$ of the first camera 104 relative to the body 102, and the second spatial position comprises a second position $Y_P$ and a second orientation $Y_O$ of the second camera 106 relative to the body 102. As used herein, the term "orientation" refers to the angular orientation of a camera's field of view or focal line in a three-dimensional space.

Figure 5:
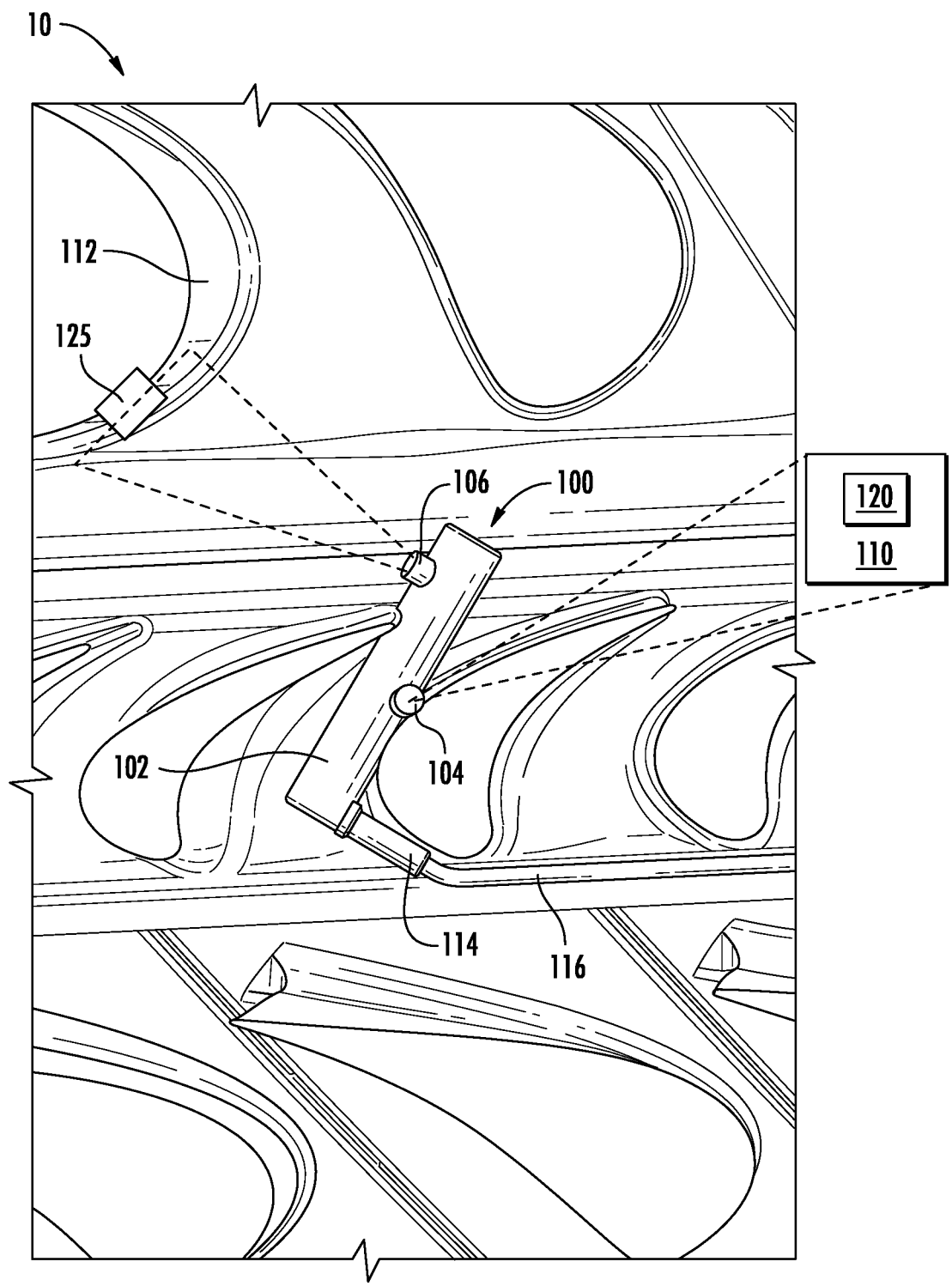
FIG. 5 is a cross-sectional view of the compressor blades and the tool assembly in position for imaging the gas turbine engine.

Notably, for the embodiment depicted, the first orientation $X_O$ defines an angle with the second orientation $Y_O$ in a plane defined by the longitudinal direction $L_1$ and transverse direction T greater than 0, such as greater than 10 degrees, such as greater than 20 degrees, such as greater than 45 degrees, such as less than 360 degrees. More specifically, for the embodiment shown, the angle defined between the first orientation $X_O$ and the second orientation $Y_O$ in the plane defined by the longitudinal direction $L_1$ and transverse direction T is equal to about 90 degrees. Also, for the embodiment shown, the first and second orientations $X_O$, $Y_O$ are each parallel to the plane defined by the latitudinal direction $L_2$ and transverse direction T. However, in one or more embodiments, one or both of the first and second orientations $X_O$, $Y_O$ may instead define an angle greater than 0 with the plane defined by the latitudinal direction $L_2$ and transverse direction T. The exemplary tool assembly 100 depicted further includes an attachment member 114 to attach the body 102 to another structure. In one embodiment, as shown in FIGS. 4 and 5, the attachment member 114 can be attached to a structure 116 external to the tool assembly 100, e.g., outside of the body of the gas turbine engine 10. The attachment member 114 may be attached to or part of a robotic arm, a telescoping arm, a reel, a cable, or any other structure 116 that may maneuver the tool assembly 100 into a desired position relative to the gas turbine engine 10. As used herein, the term "structure 116" may refer to any of the above listed examples.

In an exemplary embodiment, the body 102 is a rigid body to which the first camera 104 and the second camera 106 are attached. In alternative embodiments, the body 102 may be semi-rigid (e.g., semi-flexible) to allow for easier positioning. For example, the body 102 may have one or more sections or segments where the body 102 is flexible, while the other sections or segments remain rigid. In certain embodiments, the sections where the first camera 104 and the second camera 106 are located, as well as the sections in between the cameras, may remain rigid. However, it will be appreciated that each rigid section may be pivoted or otherwise moved relative to the adjacent section as long as the relative positioning is known. In other embodiments, the body 102 may include a hinge that can be locked into a particular position. The first camera 104 may be on an opposite side of the locked hinge of the body 102 from the second camera 106. Alternatively, the first location $X_L$ and the second location $Y_L$ may be on the same side of the hinge. As mentioned previously, the body 102 may be elongated and may further have any of the above described properties.

In the exemplary embodiment, and as shown in FIG. 4, the first camera 104 is positioned in view of a reference feature 120. The reference feature 120 may be located on a first component 110 of the gas turbine engine 10. In the exemplary embodiment, the second camera 106 is positioned in view of a target feature 125, with the target feature 125 located on a second component 112. As used herein, the terms "reference feature" and "target feature" may be used to refer to locations, portions, or other identifiable regions on one or more components of the gas turbine engine 10 between which the relative positioning and relative orientation is known or may otherwise be calculated or deduced. For example, if controller 108 knows the dimensions of the reference feature 120, the controller 108 may be able to determine the dimensions of the target feature 125 based on their known spatial relationship. In one specific non-limiting embodiment, the reference feature 120 is a tip of a turbine blade, and the target feature 125 is the tip of a compressor blade. In another non-limiting embodiment, the reference feature 120 is a compressor blade, and the target feature 125 is a part of a stator vane. Additionally, the reference feature 120 may refer to part of the turbine shroud 76, while the target feature 125 is a part of a compressor blade or stator vane. In other additional embodiments, the reference feature 120 and/or the target feature 125 may refer to part of an airfoil or a guide vane.

Further, it will be appreciated that the reference feature 120 and the target feature 125 may be located on any component of the gas turbine engine 10. The component may be internal or external to the gas turbine engine 10. For example, the body 102 may be partially inserted within the gas turbine engine 10 such that the second camera 106 is in view of an internal component while the first camera 104 remains external to the gas turbine engine 10 and in view of an external component. Alternatively, the first camera 104 may be in view of an internal component while the second camera 106 is in view of an external component. Additionally, according to some embodiments, the target feature 125 may be located on a second component 112 of the gas turbine engine 10, as shown in FIG. 4. Alternatively, the reference feature 120 and the target feature 125 may be located on the same component of the gas turbine engine 10. For example, the reference feature 120 and the target feature 125 may both be located on the first component 110 or may both be located on the second component 112. It will be understood that such feature examples are specific to a gas turbine engine 10 and that in utilization in another inspection scenario or example alternative reference and target features would be applicable.

Still referring to FIG. 4, the first camera 104 and the second camera 106 are shown fixed to the body 102 in the exemplary embodiment, where the body 102 is elongated. In another embodiment, the first camera 104 and the second camera 106 are embedded within the body 102. In other embodiments, the first camera 104 and/or the second camera 106 are mounted on top of the body 102. In yet other embodiments, the first camera 104 may be fixed to the body 102 while the second camera 106 is embedded within the body 102, or vice versa.

Furthermore, the location of the first camera 104 relative to the second camera 106 (or rather, a difference between the first location $X_L$ and the second location $Y_L$), along with the first spatial position of the first camera 104 within the gas turbine engine provides a reference to determine the second spatial position of the second camera 106 within the gas turbine engine 10. As mentioned previously, the spatial position of an object refers to both the relative position and the relative orientation of the object. For example, the first camera 104 may have a first position $X_P$ and a first orientation $X_O$ within the gas turbine engine 10, collectively, the first spatial position. The first position $X_P$ and a first orientation $X_O$ are relative to the reference feature 120 that is within view of the first camera 104. Likewise, the second camera 106 may have a second position $Y_P$ and a second orientation $Y_O$ within the gas turbine engine 10, collectively, the second spatial position. In the exemplary embodiment, the second position $Y_P$ and the second orientation $Y_O$ are relative to the target feature 125 that is within view of the second camera 106. The first relative position $X_P$ may refer to a distance between the first camera 104 and the reference feature 120 on the first component 110 and the first relative orientation $X_O$ may refer to, e.g., a vector from the reference feature 120 to the first camera 104. Similarly, the second position $Y_P$ may refer to a distance between the second camera 106 and the target feature 125 on the second component 112 and the second orientation $Y_O$ may refer to, e.g., a vector from the target feature 125 to the second camera 106.

The distance between the first location $X_L$ and the second location $Y_L$ along the body 102 is known. Similarly, the relative positions between the first spatial position and the second spatial position are known. Specifically, the second orientation $Y_O$ relative to the first orientation $X_O$ is known (e.g., about 90 degrees in the embodiment shown), and the second position $Y_P$ relative to the first position $X_P$ is known. In the exemplary embodiment, the controller 108 will receive data indicative of one or more images of a reference feature 120 from the first camera 104 and determine data indicative of the first spatial position of the first camera 104 within the gas turbine engine 10 based at least in part on the received data indicative of the one or more images of the reference feature 120. Once the controller 108 has determined the first spatial position of the first camera 104 within the gas turbine engine 10, it can then determine the second spatial position of the second camera 106 within the gas turbine engine 10 using the known relative locations $X_L$, $Y_L$ and the first and second spatial positions of the first and second cameras 104, 106 (e.g., the known first and second spatial positions of the first and second cameras 104, 106 relative to the body 102).

Further, the controller 108 can be configured to receive data indicative of one or more images of a target feature 125 using the second camera 106 and to determine data indicative of dimensions of the target feature 125 based at least in part on the received data indicative of the one or more images of the target feature 125. The controller 108 may use the determined data indicative of the dimensions of the target feature 125 to generate a three-dimensional representation of the target feature 125. This three-dimensional representation of the target feature 125 may include measurements relating to the depth, size, and/or location of the target feature 125. In the exemplary embodiment, the target feature 125 is a defect on a component, e.g., the second component 112, and the three-dimensional representation can be used to inspect the defect and determine maintenance and/or remediation methods that are needed, if any.

In other embodiments, the tool assembly 100 further includes additional cameras, such as a third camera 107 fixed to the body 102 at a third location $Z_L$ spaced from the first location $X_L$ and the second location $Y_L$, where the distance between $Z_L$, $Y_L$, and/or $X_L$ is known. In such an embodiment, the third camera 107 is positioned in view of an auxiliary feature 127. The auxiliary feature 127 may be located on the same component as the reference feature 120, the target feature 125, or both. Alternatively, as shown in FIG. 4, the auxiliary feature 127 may be located on a third component 113 of the gas turbine engine 10 that is different from both the first component 110 and the second component 112. The third camera 107 has a third spatial position, where the third spatial position is known relative to the first spatial position, the second spatial position, or both. The third camera 107 may have a third position $Z_P$ and a third orientation $Z_O$, within the gas turbine engine 10, collectively, the third spatial position. The third position $Z_P$ and a third orientation $Z_O$ are relative to the auxiliary feature 127 that is within view of the third camera 107. In embodiments where the tool assembly 100 further includes additional cameras, the controller 108 may be further configured to determine the third spatial position based at least in part on the first spatial position of the first camera 104 and/or the second spatial position of the second camera 106, obtain one or more images of the auxiliary feature 127 using the third camera 107, derive one or more dimensions of the auxiliary feature 127, and generate a three-dimensional representation of the auxiliary feature 127 based at least in part on the determined data indicative of the one or more dimensions of the auxiliary feature 127.

The cameras can represent any suitable imaging device including any optical sensor capable of capturing still or moving images. Suitable types of cameras may be a CMOS camera, a CCD camera, an analog, a digital camera, a video camera or any other type of device capable of capturing an image. It is further contemplated that a borescope camera or an endoscope camera can be utilized. Further still, the camera may be a monocular camera or a binocular camera. For example, in some embodiments, the first camera 104 and the second camera 106 may record images at a rate of at least about 2 frames-per-second (FPS) and may have a resolution of greater than 0.1 megapixels (MP), such as greater than 1 MP, 2 MP, or 3 MP, and up to about 750 MP. The first camera 104 and the second camera 106 may each include a time mechanism to enable the camera to record images periodically after a specified time interval. Additionally, or alternatively, where either the first camera 104 or the second camera 106 are positioned in view of blades, the tool assembly 100 may include a trigger mechanism that is activated by rotation of the blades. In some embodiments, the first camera 104, the second camera 106, or both may include a video recording device, such that the first camera 104 is capable of recording video of the first component 110 and/or the second camera 106 is capable of recording video of the second component 112.

Additionally, the first camera 104 and second camera 106 may be calibrated before images are taken. In particular, calibration of the first and second cameras 104 and 106 may include estimating intrinsic and/or extrinsic parameters to ensure accuracy. For example, the first and second cameras 104 and 106 may be calibrated to account for angular separation and/or circumferential distance between pixels. Camera calibration may also account for lens distortions and lens mounting errors (e.g., after the first camera 104 and the second camera 106 are fixed to the body 102). Further, calibrating the cameras may also help measure dimensions or determine the location of the camera within the gas turbine engine 10. It will be appreciated that the first and second cameras 104 and 106 may additionally or alternatively be calibrated in any other way.

Further, in other embodiments, the first camera 104, the second camera 106, or both may include any other image sensing devices, such as infrared, ultrasound, inductive, position encoder, and/or eddy-current sensing devices. Specifically, in the illustrated embodiment, the first camera 104 and the second camera 106 may each include one or more sensors 90A, 90B, such as positioning sensors. As used herein, the term "positioning sensors" may refer to any sensors that are capable of providing feedback to the controller 108 to help position the body 102. For example, the sensors 90A, 90B may be proximity sensors, optical sensors, and/or tactile sensors. Further, in the exemplary embodiment, the one or more sensors 90A, 90B provides data to the controller 108. For example, the sensors may help position the body 102 within the gas turbine engine 10. In other embodiments, the one or more sensors 90A, 90B may locate entryways or passages for the tool assembly 100.

In yet another embodiment, feedback from the one or more sensors 90A and 90B may be used to provide a dimensional data point relating to the reference feature, the target feature, or both. By way of example, the one or more sensors 90A and 90B may comprise Inertial Measurement Units ("IMUs"). These IMUs may further comprise accelerometers, gyroscopes, magnetometers, and/or any other tools that are capable of obtaining the 3D position and/or orientation of an object. In this particular embodiment, the sensors 90A and 90B may provide a dimensional (e.g., angular) data point for the images taken by either the first camera 104, the second camera 106, or both. For example, the dimensional data point(s) for the images taken by the first camera 104 (as well as any calibration information for the first camera 104) may provide a scale for the reference feature 120. Such a configuration may more specifically provide for a scale of the reference features 120 to be determined independently of any prior data of the reference feature 120 (such as independently of any CAD information or the like).

In other embodiments, the first camera 104, the second camera 106, a light source, and a storage device may form an integrated assembly. The light source may be light emitting diodes (LEDs), fluorescent lights, incandescent lights, or any other suitable light device, and may be oriented to illuminate the compressor blades 82 or any other region capable of image record by the first and second cameras 104, 106. Multiple color light sources may be used, such as blue, green, red, white, or other colors. The storage device may be a non-volatile memory device (e.g., a flash memory device) configured to provide a desired storage capacity. In one embodiment, the storage device may provide at least 2 GB, 4 GB, 6 GB, or 8 GB of memory, and up to about 2 TB of memory.

As noted, the exemplary controller 108 depicted in FIG. 4 is configured to receive the data sensed from the one or more sensors 90A, 90B and, e.g., may make control decisions for the tool assembly 100 based on the received data. In one or more exemplary embodiments, the controller 108 depicted in FIG. 4 may be a stand-alone controller 108 for the tool assembly 100, or alternatively, may be integrated into one or more other controllers.

Referring particularly to the operation of the controller 108, in at least certain embodiments, the controller 108 can include one or more computing device(s) 130. The computing device(s) 130 can include one or more processor(s) 131 and one or more memory device(s) 132. The one or more processor(s) 131 can include any suitable processing device, such as a microprocessor, microcontroller, integrated circuit, logic device, and/or other suitable processing device. The one or more memory device(s) 132 can include one or more computer-readable media, including, but not limited to, non-transitory computer-readable media, RAM, ROM, hard drives, flash drives, and/or other memory devices.

The one or more memory device(s) 132 can store information accessible by the one or more processor(s) 131, including computer-readable instructions 133 that can be executed by the one or more processor(s) 131. The computer-readable instructions 133 can be any set of instructions that when executed by the one or more processor(s) 131, cause the one or more processor(s) 131 to perform operations. In some embodiments, the computer-readable instructions 133 can be executed by the one or more processor(s) 131 to cause the one or more processor(s) 131 to perform operations, such as any of the operations and functions for which the controller 108 and/or the computing device(s) are configured, the operations for operating a tool assembly 100 (e.g., method 200), as described herein, and/or any other operations or functions of the one or more computing device(s) 130. The computer-readable instructions 133 can be software written in any suitable programming language or can be implemented in hardware. Additionally, and/or alternatively, the computer-readable instructions 133 can be executed in logically and/or virtually separate threads on processor(s) 131. The memory device(s) 132 can further store data 134 that can be accessed by the processor(s) 131. For example, the data 134 can include data indicative of power flows, data indicative of engine/aircraft operating conditions, and/or any other data and/or information described herein.

The computing device(s) 130 can also include a network interface 135 used to communicate, for example, with the other components of the tool assembly 100, the gas turbine engine 10 incorporating tool assembly 100, the aircraft incorporating the gas turbine engine, etc. For example, in the embodiment depicted, as noted above, the gas turbine engine 10 and/or tool assembly 100 further includes one or more sensors 90A, 90B for sensing data indicative of one or more parameters of the gas turbine engine 10, the tool assembly 100, or both. The controller 108 of the tool assembly 100 is operably coupled to the one or more sensors 90A, 90B through, e.g., the network interface 135, such that the controller 108 may receive data indicative of various operating parameters sensed by the one or more sensors 90A, 90B during operation. Further, for the embodiment shown in FIG. 4, the controller 108 is operably coupled to, e.g., the sensors 90A and 90B on or adjacent to the first camera 104 and the second camera 106, respectively. In such a manner, the controller 108 may be configured to position the body 102 in response to, for example, the data 134 sensed by the one or more sensors 90A, 90B. In other embodiments, the first camera 104 and the second camera 106 may each include one or more sensors 90A, 90B as part of the first and second cameras 104, 106.

The network interface 135 can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Referring now to FIG. 5, a cross sectional view of the compressor blades 82 and the tool assembly 100 in position for imaging the gas turbine engine 10 as described above with reference to FIGS. 1 through 4 is illustrated in accordance with aspects of the present subject matter. In the exemplary embodiment, the tool assembly 100, and, more specifically, the body 102 is inserted through borescope holes or other access ports 62, 64. The tool assembly 100 is thereby able to access the first and second components 110, 112 of the gas turbine engine 10 without substantially disassembling the gas turbine engine 10.

In the exemplary embodiment, the first component 110 is the turbine shroud 76, as shown in FIG. 5. As mentioned previously, the first component 110 may be internal or external to the gas turbine engine 10. Similarly, the second component 112 may be internal or external to the gas turbine engine 10.

Additionally, as shown in FIG. 5, the position of the tool assembly 100 allows the first camera 104 and the second camera 106 to view the reference feature 120 and the target feature 125, respectively. As mentioned previously, the attachment member 114 and structure 116 (shown schematically in FIG. 5) are used to maneuver the body 102 until it is in position within the gas turbine engine 10. The body 102 is in position when each of the first camera 104 and the second camera 106 have at least the reference feature 120 and the target feature 125, respectively, within its field of view. In FIG. 5, the reference feature 120 is located on the first component 110, and the target feature 125 is located on the second component 112. The second component 112 is the component that is within the field of view of the second camera 106 as shown. As used herein, the term "field of view" of a camera is defined as the maximum area of a sample that a camera can image and is typically dependent, at least in part, on the focal length of the lens of the camera. The field of view may also be defined in any other manner as known to those of ordinary skill in the art.

Figure 6:
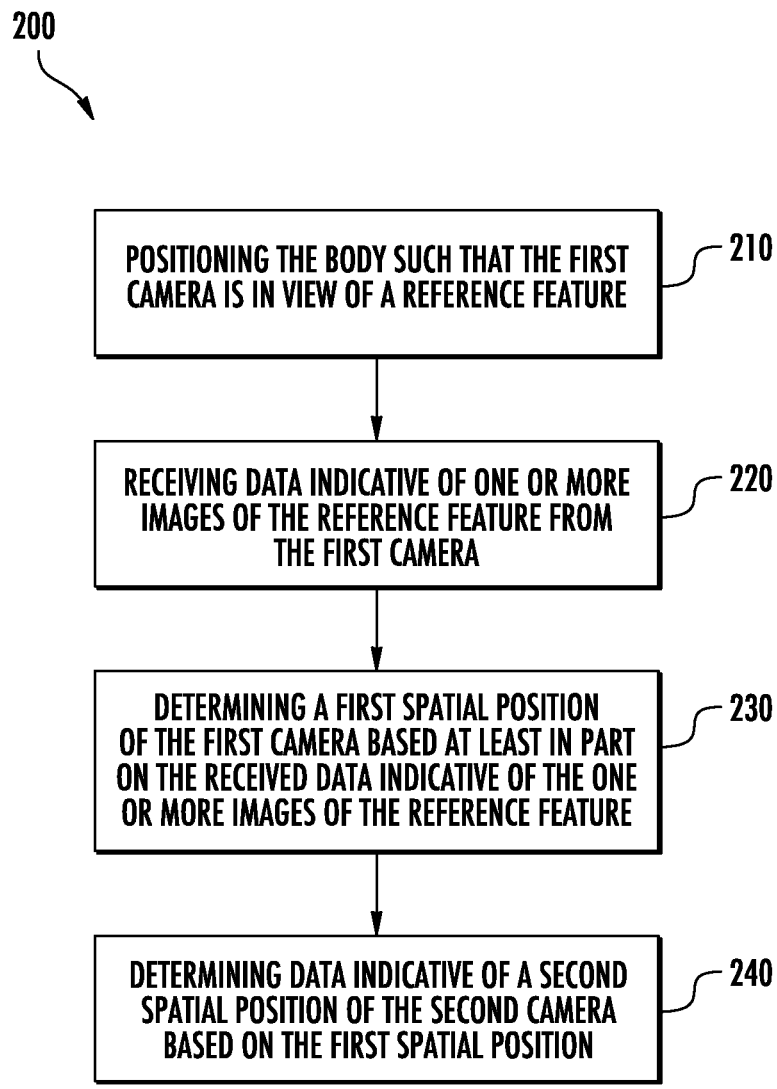
FIG. 6 illustrates a flow diagram of one embodiment of a method for inspecting components of a machine in accordance with aspects of the present subject matter.

Now that the structure of the tool assembly 100 has been described, an exemplary method 200 of using the tool assembly 100 will be described. FIG. 6 illustrates a flow diagram of one embodiment of a method for inspecting components of the gas turbine engine 10 described above with reference to FIG. 1. In general, the method 200 images, measures, and models the target feature 125.

As shown in FIG. 6, method 200 generally includes, at 210, positioning the body 102 such that the first camera 104 is in view of the reference feature 120; at 220, receiving data indicative of one or more images of the reference feature 120 from the first camera 104; at 230, determining a first spatial position of the first camera 104 based at least in part on the received data indicative of the one or more images of the reference feature 120; and, at 240, determining a second spatial position of the second camera 106 based on the first spatial position. Additionally, in other embodiments, the method may further include receiving data indicative of one or more images of a target feature 125 using the second camera 106. Furthermore, in the exemplary embodiment, the controller 108 is also configured to generate a three-dimensional representation of the target feature 125 and/or to derive dimensions of the target feature 125. Each of these blocks will be described below in more detail.

At 210, the body 102 is positioned such that the first camera 104 is in view of a reference feature 120. In the exemplary embodiment, the body 102 is positioned such that the first camera 104 is within view of the reference feature 120 of the first component 110 and such that the second camera 106 is in view of the target feature 125 of the second component 112 of the gas turbine engine 10. However, as mentioned previously, the reference feature 120 and the target feature 125 may be located on the same component. Further, in one embodiment, the reference feature 120 may refer to the entirety of the first component 110. In the exemplary embodiment, the reference feature 120 refers to a compressor blade. However, it will be appreciated that the reference feature 120 may refer to any other component of a gas turbine engine 10. In an alternative embodiment, the reference feature 120 is a portion of the first component 110, such as a specific feature of the first component 110. For example, the reference feature 120 may be only a tip of a compressor blade. Positioning the body 102 may additionally include inserting the body 102 into the gas turbine engine 10. The body 102 may be inserted into the gas turbine engine 10 through borescope holes or other access ports 62, 64. Further, the attachment member 114 and structure 116 may help position the body 102 such that the first camera 104 is within view of the reference feature 120 and such that the second camera 106 is in view of the target feature 125.

At 220, the controller 108 receives data indicative of one or more images of the reference feature 120 from the first camera 104. In the exemplary embodiment, the first camera 104 will take one or more images of the reference feature 120 that is within its field of view. The data indicative of the one or more images can be saved in the storage device temporarily, e.g., in RAM, or permanently, e.g., transferred to a more permanent storage device.

In the exemplary embodiment, the information regarding the reference feature 120 is already known. This information may be three-dimensional information of the reference feature 120. As used herein, the term "three-dimensional information" refers to size, location, and/or depth of the reference feature 120. In particular, the location of the reference feature 120 may refer to a spatial position within a three-dimensional space, e.g., the $L_1L_2T$ plane. The controller 108 may obtain the information by estimating, determining, or measuring actual measurements of the reference feature 120 or in any other manner that would reasonably be able to obtain this information. In the exemplary embodiment, obtaining the three-dimensional information regarding the reference feature 120 includes obtaining information from a computer aided design (CAD) model. The CAD model may be inputted by a user or gathered from a database. The CAD model may also be derived through parallax using monocular cameras. In one specific non-limiting embodiment, the reference feature 120 may be located on the first component 110, which may, for example, be a rotor blade. In this case, the model number for the first component 110 (rotor blade, in this example) may provide sufficient information. Additionally, in this embodiment, a user can then input the model number into the controller 108 to search a database of CAD models, blueprints, schematics, or any other type of reference information that is capable of providing three-dimensional information.

Furthermore, where the tool assembly 100 further comprises one or more sensors 90A and 90B, the three-dimensional information may be obtained from the one or more sensors 90A and 90B. In one particular embodiment, for example, the one or more sensors 90A and 90B may further comprise IMUs, as mentioned above. The IMUs may provide this three-dimensional information to the controller 108.

At 230, the controller 108 determines the first spatial position of the first camera 104 based at least in part on the one or more images of the reference feature 120. The first spatial position may be derived using an algorithm executed by the controller 108 and can be stored in the storage memory device. The spatial position of an object may be stored in coordinates form, in vector form, or in any other form that may describe the object's spatial position.

In the exemplary embodiment, the controller 108 will be able to determine the first spatial position of the first camera 104 relative to the reference feature 120 based at least in part on the images of the reference feature 120 and the known information of the reference feature 120. For example, by comparing the images of the reference feature 120 taken using the first camera 104 with the known three-dimensional information about the reference feature 120, the controller 108 will be able to determine the first spatial position of the first camera 104 relative to the reference feature 120.

At 240, the controller 108 determines the second spatial position of the second camera 106. In the exemplary embodiment, the controller 108 executes an algorithm to use the now known first spatial position of the first camera 104 to calculate the second spatial position of the second camera 106. As the relative spatial position between the first camera 104 and the second camera 106 along the body 102 is known, the controller 108 will be able to determine the second spatial position based on this known relative spatial position and the first spatial position determined at 230.

Method 200 may further include obtaining one or more images of the target feature 125 using the second camera 106. In the exemplary embodiment, the target feature 125 is a feature on the second component 112. The target feature 125 may be a defect or any particular part of the second component 112. The one or more images of the target feature 125 and/or the second spatial position of the second camera 106 may be used to derive data indicative of one or more dimensions of the target feature 125. The dimensions of the target feature 125 may be stored on the storage memory device. Further, in the exemplary embodiment, the received data indicative of one or more dimensions of the target feature 125 is used to create a three-dimensional representation of the target feature 125. In one embodiment, the three-dimensional representation may be a point cloud. A point cloud is set of data points defined in a coordinate system and may include color and depth data. In some embodiments, the point cloud may be used to create a CAD model. The CAD model may use any CAD software, and may be generated from any of a large variety of well-known computer aided design (CAD) software systems such as AutoCAD®, TurboCAD®, DesignCAD 3D Max, etc. In other embodiments, the CAD model may be a topographical model, a surface model, a wireframe model, a shell model, or any other type of CAD model. It will be appreciated that the present disclosure includes any other representation that may accurately portray the target feature 125.

Additionally, in some embodiments, each of the first camera 104 and the second camera 106 may obtain two or more sets of images, where each set of images includes one or more images. The first set of images may be taken when the first camera 104 and the second camera 106 are in a first position. The second set of images may be taken when the first and second cameras 104 and 106 are at a second position spaced apart from the first position by a circumferential distance, e.g., an engine rotation angle. Specifically, if the rotor is moving, each set of images may be taken synchronously (e.g., at or substantially around the same time) by the first and second cameras 104 and 106. In this particular embodiment, the circumferential distance is calculated using at least one reference feature 120 in the first and second sets of images from the first camera 104. Alternatively, where the tool assembly 100 also includes sensors 90A and 90B, and where the sensors 90A and 90B further include IMUs, the circumferential distance may be obtained from the IMUs. The first and second sets of images taken by the second camera 106 may then be used to determine the dimensions of the target feature 125 based on the circumferential distance.

It will also be appreciated that the tool assembly 100 may be used in any compatible machine across different industries. One of ordinary skill in the art will recognize that the inherent flexibility of the tool assembly 100 allows for inspection and maintenance in different industrial machines of varying sizes. For example, in some embodiments, the tool assembly 100 may further include a third camera 107 fixed at a third location and at a third spatial position along the body 102, where the third camera 107 is positioned in view of an auxiliary feature 127 and/or third component 113. In these embodiments, the method 200 will further include the steps of determining the third spatial position based at least in part on the first spatial position and/or the second spatial position; receiving data indicative one or more images of the auxiliary feature 127 using the third camera 107, determining data indicative of one or more dimensions of the auxiliary feature 127, and generating a three-dimensional representation of the auxiliary feature 127 based at least on the determined data indicative of one or more dimensions of the auxiliary feature 127. For example, the tool assembly 100 may also include four, five, six, seven, or more cameras operating in the same manner as described. Moreover, the additional cameras may be operated simultaneously with the first camera 104 and the second camera 106 to allow for simultaneous imaging of multiple features and/or components. These embodiments would allow for greater efficiency in routine inspection and maintenance and may help identify and measure defects in a multitude of internal machines and components including, but not limited to, those of gas turbine engines.

For example, during operation of a machine, damage can occur from normal wear and tear, as well as other causes. Such incidents of damage may reduce the overall efficiency and productivity of the machine. Moreover, damage to machine components may result in increased maintenance costs and decreased engine life. Accordingly, maintenance of the machine typically requires an inspection of the components. In many cases, these inspections may be executed by a user-inspector and is both time and labor intensive. Moreover, inspections may yield varying results, depending on the user-inspector. The tool assembly 100 could be used to perform these inspections and to increase the efficiency of the inspections. Although the tool assembly 100 is described herein with reference to machines and gas turbine engines specifically, the tool assembly 100 is also applicable to other fields, e.g., the medical field to inspect difficult to reach places and/or to estimate sizes of tumors and other foreign objects within a human body.

Further aspects of the invention are provided by the subject matter of the following clauses:

1. A tool assembly comprising: a body; a first camera fixed to the body at a first location; a second camera fixed to the body at a second location spaced from the first location; and a controller in operative communication with the first camera and the second camera, the controller being configured to: receive data indicative of one or more images of a reference feature from the first camera; determine data indicative of a first spatial position of the first camera based at least in part on the received data indicative of the one or more images of the reference feature; and determine data indicative of a second spatial position of the second camera based on the first spatial position, a known spatial relationship between the first location and the second location, or both.

2. The tool assembly of any preceding clause, wherein the first spatial position comprises a first position and a first orientation of the first camera within the gas turbine engine, and wherein the second spatial position comprises a second position and a second orientation of the second camera within the gas turbine engine.

3. The tool assembly of any preceding clause, wherein the controller is further configured to: receive data indicative of one or more images of a target feature using the second camera.

4. The tool assembly of any preceding clause, wherein the controller is further configured to: determine data indicative of one or more dimensions of the target feature based at least in part on the received data indicative of the one or more images of the target feature.

5. The tool assembly of claim any preceding clause, wherein the controller is further configured to: generate a three-dimensional representation of the target feature using the determined data indicative of the one or more dimensions of the target feature.

6. The tool assembly of any preceding clause, wherein the reference feature is located on a first component, and wherein the target feature is located on a second component.

7. The tool assembly of any preceding clause, wherein the body is an elongated body.

8. The tool assembly of any preceding clause, wherein each of the first camera and the second camera comprise one or more sensors, wherein the one or more sensors provide data to the controller.

9. The tool assembly of any preceding clause, the tool assembly further comprising: a third camera fixed to the body at a third location spaced from the first location and the second location, wherein the third camera is positioned in view of an auxiliary feature.

10. The tool assembly of any preceding clause, wherein the controller is further configured to: determine a third spatial position of the third camera based on the first spatial position, the second spatial position, or both; receive data indicative of one or more images of the auxiliary feature from the third camera; determine data indicative of dimensions of the auxiliary feature based at least in part on the received data indicative of one or more images of the auxiliary feature; and generate a three-dimensional representation of the auxiliary feature based at least in part on the determined data indicative of the dimensions of the auxiliary feature.

11. A method for inspecting a gas turbine engine using a tool assembly, the tool assembly comprising a body, a first camera fixed to the body at a first location, a second camera fixed to the body at a second location spaced from the first location, the method comprising: positioning the body such that the first camera is in view of a reference feature; receiving data indicative of one or more images of the reference feature from the first camera; determining data indicative of a first spatial position of the first camera based at least in part on the received data indicative of the one or more images of the reference feature; and determining data indicative of a second spatial position of the second camera based on the first spatial position.

12. The method of any preceding clause, the method further comprising: receiving data indicative one or more images of a target feature using the second camera.

13. The method of any preceding clause, the method further comprising: determining data indicative of one or more dimensions of the target feature.

14. The method of any preceding clause, the method further comprising: generating a three-dimensional representation of the target feature based at least in part on the determined data indicative of the one or more dimensions of the target feature.

15. The method of any preceding clause, wherein generating the three-dimensional representation of the target feature further comprises: generating a point cloud.

16. The method of any preceding clause, wherein positioning the body such that the first camera is in view of the reference feature comprises: inserting the body into the gas turbine engine.

17. The method of any preceding clause, wherein the reference feature is located on a first component, and wherein the target feature is located on a second component.

18. The method of any preceding clause, wherein the first spatial position comprises a first position and a first orientation of the first camera within the gas turbine engine, and wherein the second spatial position comprises a second position and a second orientation of the second camera within the gas turbine engine.

19. The method of any preceding clause, wherein the tool assembly further comprises a third camera fixed to the body at a third location spaced from the first location, the second location, or both, wherein the third camera is positioned in view of an auxiliary feature.

20. The method of any preceding clause, wherein the method further comprises: determining a third spatial position of the third camera based at least in part on the first spatial position or the second spatial position; receiving data indicative of one or more images of the auxiliary feature using the third camera; determining data indicative of one or more dimensions of the auxiliary feature based at least in part on the received data indicative of one or more images of the auxiliary feature; and generating a three-dimensional representation of the auxiliary feature based at least on the determined data indicative of the one or more dimensions of the auxiliary feature.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An inspection system comprising:
   a first camera at a first location and having a first orientation relative to a local coordinate system of the inspection system, the local coordinate system having a longitudinal direction, a latitudinal direction, and a transverse direction;
   a second camera at a second location spaced a known spatial distance from the first location and having a second orientation relative to the local coordinate system, the first orientation defines an angle with the second orientation relative to a plane defined by the latitudinal direction and the transverse direction greater than zero and less than 360 degrees; and
   a controller in operative communication with the first camera and the second camera, the controller being configured to:
      receive data indicative of one or more images of a reference feature from the first camera;
      determine data indicative of a first spatial position of the first camera based at least in part on the received data indicative of the one or more images of the reference feature;
      determine data indicative of a second spatial position of the second camera based on a known spatial relationship between the first location and the second location; and
      receive data indicative of one or more images of a target feature using the second camera,
      wherein the target feature not being in view of the first camera.

2. The inspection system of claim 1, wherein the first spatial position comprises a first position within an apparatus, and wherein the second spatial position comprises a second position within the apparatus.

3. The inspection system of claim 1, wherein the controller is configured to determine data indicative of one or more dimensions of the target feature based at least in part on the received data indicative of the one or more images of the target feature.

4. The inspection system of claim 3, wherein the controller is configured to generate a three-dimensional representation of the target feature using the determined data indicative of the one or more dimensions of the target feature.

5. The inspection system of claim 1, wherein the reference feature is located on a first component, and wherein the target feature is located on a second component.

6. The inspection system of claim 1, wherein the data includes at least a distance relative to the reference feature and a vector from the reference feature to the first camera.

7. The inspection system of claim 1, wherein each of the first camera and the second camera further comprise one or more sensors, wherein the one or more sensors provide data to the controller.

8. The inspection system of claim 1 further comprising:
   a third camera at a third location spaced from the first location and the second location relative to the local coordinate system, wherein the third camera is positioned in view of an auxiliary feature.

9. The inspection system of claim 8, wherein the controller is further configured to:
   determine a third spatial position of the third camera based on the first spatial position, the second spatial position, or both;
   receive data indicative of one or more images of the auxiliary feature from the third camera;
   determine data indicative of dimensions of the auxiliary feature based at least in part on the received data indicative of one or more images of the auxiliary feature; and
   generate a three-dimensional representation of the auxiliary feature based at least in part on the determined data indicative of the dimensions of the auxiliary feature.

10. A method for using an inspection system, the inspection system comprising a first camera at a first location and having a first orientation relative to a local coordinate system of the inspection system, the local coordinate system having a longitudinal direction, a latitudinal direction, and a transverse direction and a second camera at a second location spaced a known spatial distance from the first location and having a second orientation relative to the local coordinate system, the first orientation defines an angle with the second orientation relative to a plane defined by the latitudinal direction and the transverse direction greater than zero and less than 360 degrees, the method comprising:
    obtaining one or more images of a reference feature from the first camera;
    determining a first spatial position of the first camera based at least in part on the one or more images of the reference feature;
    determining a second spatial position of the second camera based on a known spatial relationship between the first location and the second location; and
    obtaining one or more images of a target feature using the second camera,
    wherein the target feature not being in view of the first camera.

11. The method of claim 10 further comprising determining one or more dimensions of the target feature.

12. The method of claim 11 further comprising generating a three-dimensional representation of the target feature based at least in part on the one or more dimensions of the target feature.

13. The method of claim 12, wherein generating the three-dimensional representation of the target feature comprises generating a point cloud.

14. The method of claim 10 further comprising inserting the first camera into a gas turbine engine having the reference feature.

15. The method of claim 14, wherein the reference feature is located on a first component and the target feature is located on a second component.

16. The method of claim 14, wherein the first spatial position comprises a first position and a first orientation of the first camera within the gas turbine engine, and the second spatial position comprises a second position and a second orientation of the second camera within the gas turbine engine.

17. The method of claim 10, wherein the inspection system comprises a third camera at a third location spaced from the first location, the second location, or both, wherein the third camera is positioned in view of an auxiliary feature.

18. The method of claim 17 comprises:
    determining a third spatial position of the third camera based at least in part on the first spatial position or the second spatial position;

obtaining one or more images of the auxiliary feature using the third camera;

determining one or more dimensions of the auxiliary feature based at least in part on the one or more images of the auxiliary feature; and generating a three-dimensional representation of the auxiliary feature based at least on the one or more dimensions of the auxiliary feature.

\* \* \* \* \*